(No Model.) 3 Sheets—Sheet 2.
E. N. BLISS & J. F. MIDDLETON.
AUTOMATIC ELECTRIC PHOTOGRAPHING APPARATUS.
No. 378,426. Patented Feb. 28, 1888.
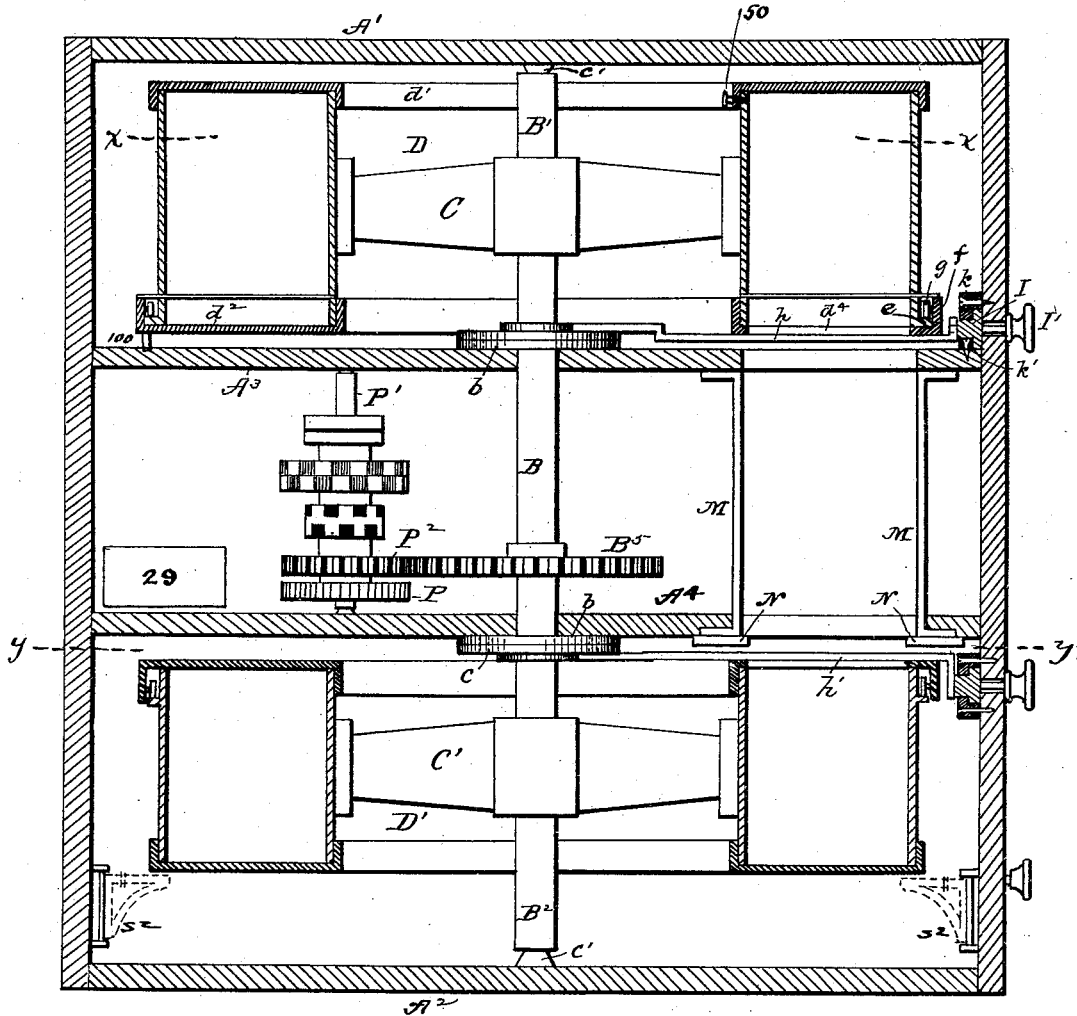
Fig 2.
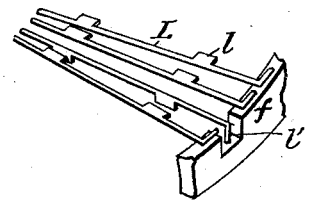
Fig. 4.
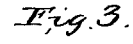
Fig. 3.
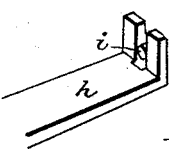
Fig. 10.
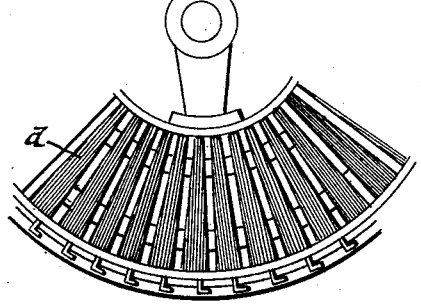
WITNESSES:
Wm. A. Rosenbaum
G. H. Stockbridge
INVENTOR.
Edw. N. Bliss.
Jas. F. Middleton.
BY W. J. Johnston
ATTORNEY.

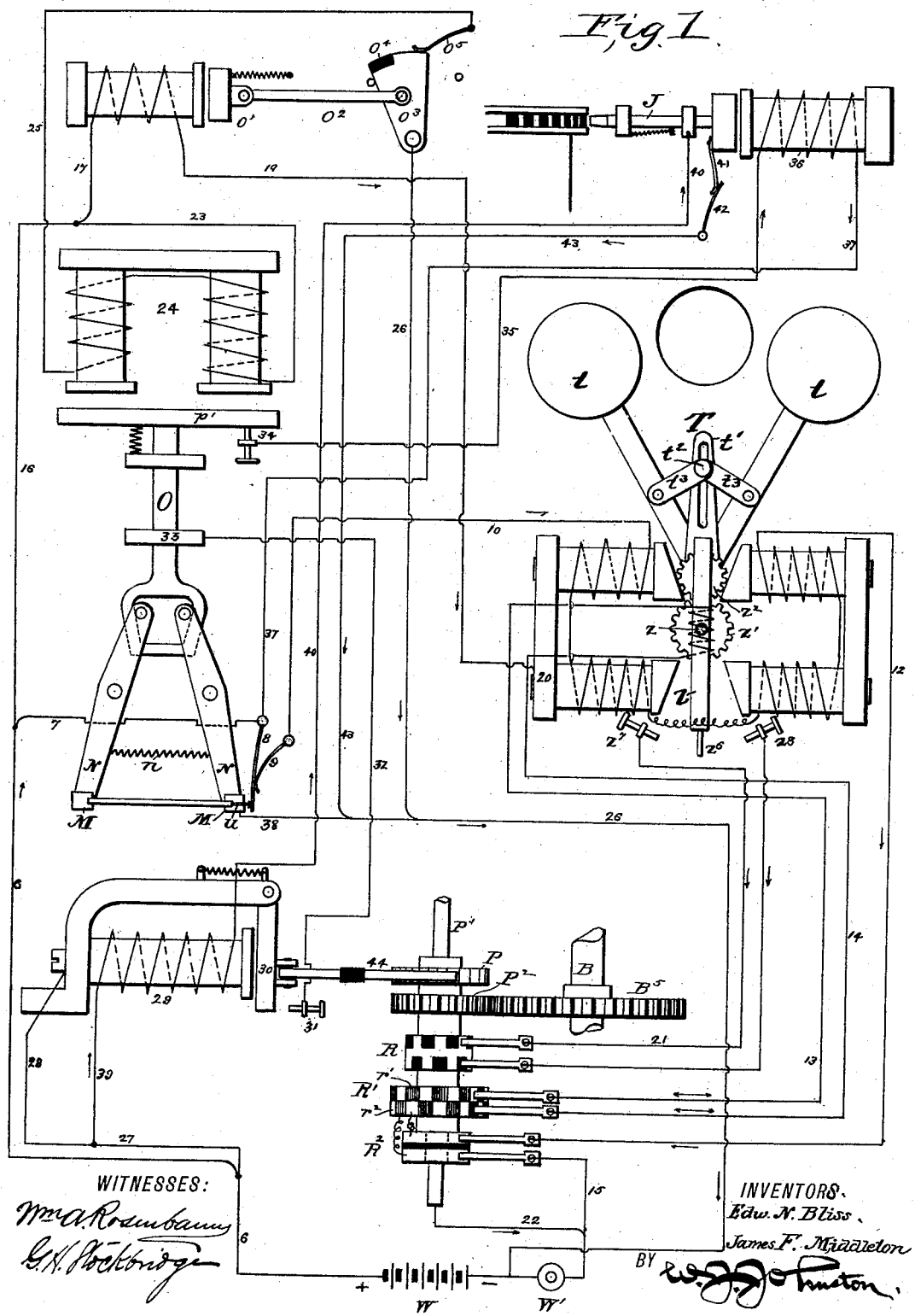

(No Model.) 3 Sheets—Sheet 3.

E. N. BLISS & J. F. MIDDLETON.
AUTOMATIC ELECTRIC PHOTOGRAPHING APPARATUS.

No. 378,426. Patented Feb. 28, 1888.

WITNESSES:

INVENTOR.
Edw. N. Bliss.
Jas. F. Middleton.
BY
ATTORNEY.

UNITED STATES PATENT OFFICE.

EDWARD N. BLISS AND JAMES F. MIDDLETON, OF NEWARK, NEW JERSEY.

AUTOMATIC ELECTRIC PHOTOGRAPHING APPARATUS.

SPECIFICATION forming part of Letters Patent No. 378,426, dated February 28, 1888.

Application filed April 13, 1887. Serial No. 234,614. (No model.)

*To all whom it may concern:*

Be it known that we, EDWARD N. BLISS and JAMES F. MIDDLETON, citizens of the United States, and residents of Newark, in the county of Essex and State of New Jersey, have invented certain new and useful Improvements in Automatic Electric Photographing Apparatus; and we do hereby declare that the following is a full, clear, and exact description of our invention, such as will enable others skilled in the art to which it appertains to make and use the same.

Our invention has to do with carrying out automatically, through the medium of electricity, the different steps in the process of photographing; and it consists in providing means whereby, as the result of a single closure of an electric circuit, the exposure is made, the shutter closed, the plate dropped, and a new plate inserted in its place.

Our invention is especially designed for detective purposes, and our apparatus will usually be set up in banks, stores, or brokers' offices, and so arranged that the lens will be focused upon a point where customers will ordinarily stand in transacting business. For example, one of our devices may be set up in a bank behind the teller and focused upon the teller's window. Whenever a suspicious person presents a paper at the window the teller may, as a precautionary measure, press a push-button and operate our device. As a result a correct negative of the suspected party will be taken and preserved for future development and inspection. In many instances this might result in the detection of criminals and the saving or recovery of large amounts of money. Our apparatus might also be applied to many other uses, as to the detection of sneak thieves in private houses. It might also be employed by lecturers to drop stereopticon-plates.

We have illustrated our invention in the accompanying drawings, in which—

Figure 5:
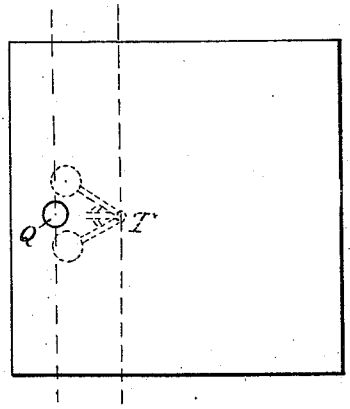
Figure 6:
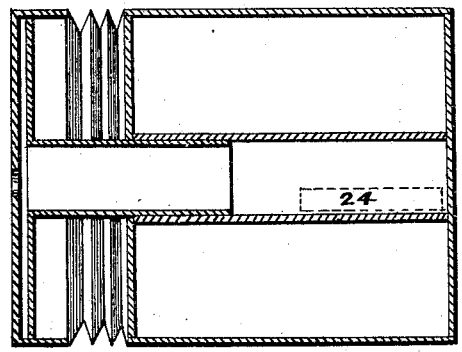
Figure 1:
Figure 8:
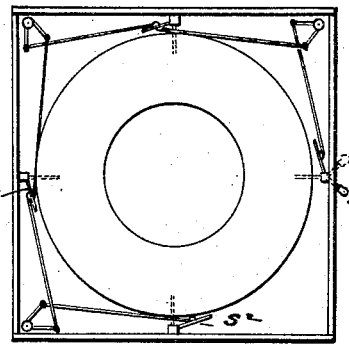
Figure 9:
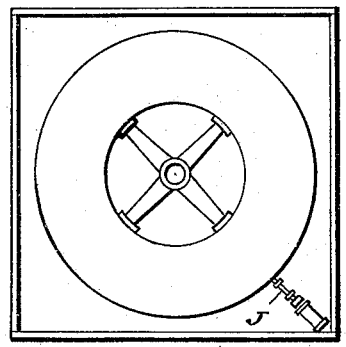
Figure 11:
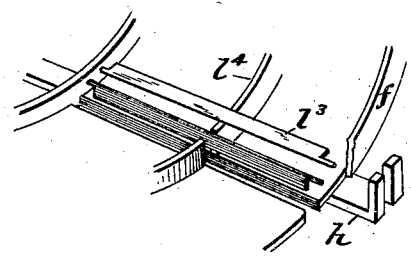

Figure 1 is a diagram of our apparatus and the circuits which operate it. Fig. 2 is a vertical section of our camera. Fig. 3 is a horizontal section through $x\ x$ in Fig. 2. Fig. 4 shows a detail. Fig. 5 is a front view of the camera drawn to a reduced scale. Fig. 6 is a vertical section through the bellows. Fig. 7 is a detail showing the location of the shutter. Fig. 8 is a plan looking down from the line $y\ y$, Fig. 2. Fig. 9 is a plan of the camera with the top removed. Fig. 10 is a detail view, and Fig. 11 illustrates a modification of the construction shown in Fig. 4.

Referring first to Fig. 2, A represents our camera, A' and A² the top and bottom thereof, respectively, and A³ and A⁴ parts of the interior frame-work. Between the parts A³ and A⁴, and having its bearings in the said parts, is located a shaft, B, on each end of which is a disk, $b$, having perforations $c\ c$. Between the frame-pieces A³ and A⁴ and the top and bottom of the camera are located, respectively, shafts B' and B², each of which has at one end a disk carrying pins which register with the holes in one of the disks $b\ b$, and each of which is hollowed out at the other end to receive a pintle, $c'$, attached to the top or bottom of the camera. The pintles $c'\ c'$ thus constitute the pivots for the whole shaft B B' B². Upon the shaft B is fixed a gear-wheel, B⁵, the function of which will be explained hereinafter. Upon the shafts B' B² are fixed frames C C', which support drums D and D'. A top view of a portion of the drum D is shown in Fig. 3. It will be seen that the drum is provided with triangular partitions $d$, between which are rectangular spaces for holding sensitive plates. The drum D' is constructed in a precisely similar way, partitions and spaces of one drum being in the same vertical plane with the corresponding partitions and spaces of the other drum. In general the construction of the two drums is the same, except where a distinction is pointed out in the description. Taking the drum D, for example, it is provided with a cover, $d'$, at the top, and also with what may be called a "cap," $d^2$, at the bottom. The cap $d^2$ is wider than the drum, and serves to admit the flange $e$ between the side $f$ of the cap and the outer wall of the drum. The flange $e$ is formed on the bottom of the drum. Above the said flanges and pivoted in the rim of the cap are rollers $g\ g$, which serve to guide the motion of the drum when it is rotated, and to lessen its friction and form a means by which the cap can be lifted out with the drum whenever new plates are inserted. The lower drum may be constructed in the above particulars just like the upper; but I have shown it provided with a cap fitting closely around its walls instead of with a cap similar to $d^2$. The cap above described and the top piece of the drum D' are each provided with a single slot, $d^4$, as indicated in Fig. 2. These slots are normally open, but can be closed from the outside of the camera by means of the slides $h\ h'$. These slides are similar, but are in reverse positions, owing to the fact that one is applied to the top of the drum D' and the other to the bottom of the drum D. Slide $h$, for example, consists of a ring around the shaft B' and an angular arm extending from the said ring under or almost under the slot $d^4$. At its free end it is formed into a hook, as shown in detail in Fig. 10. Within the hook plays a tongue or projection, $i$, extending from a block, I, which slides within a groove made by the blocks $k\ k'$. The block I is connected by a pin with a handle, I', outside the box, the pin passing through a horizontal slot in the wall of the camera. By grasping the handle I' and moving it to one side or the other the slide $h$ can be moved under or away from the slot $d^4$ at will. As has been said already, the slots are normally left uncovered. The drums are held in position by a spring-bolt, J, which passes into one of a series of holes in the outside rim of the cover $d'$. This construction is illustrated in Fig. 9 and in the upper part of Fig. 1.

Each plate is supported within the upper drum upon horizontal steps or flanges $l$, projecting from rods L. These rods extend under the partitions $d$ and out beyond the drum, where their outer ends rest upon the rim of the cap $d^2$. The inner ends of the said rods have their bearings in the inner wall of the drum. The outer ends are bent, as shown in Figs. 3 and 4, into an L shape. Now it is evident that the plates resting upon the flanges aforesaid will be supported without difficulty. At one point, however—that is to say, just opposite the slot $d^4$—the rim $f$ is cut away. (See Fig. 4.) Accordingly, when one of the L-shaped pieces comes to the cut-away portion, it will fall into the position shown at $l'$ in Fig. 4 and let the plate pass down through the slot. In going out through the slot the plate passes between grooved guiding-posts M M and comes to rest upon the outer ends of two levers, N N. This construction is illustrated in detail in Fig. 1 at the left. The levers N N are centrally pivoted, their outer ends are drawn toward each other by a spring, $n$, and their inner ends are provided with downward-projecting pins, which extend into an opening of general triangular shape in the end of the armature-lever O. The drawing up of the armature forces the pins toward each other and separates the outer ends of the levers N N far enough to allow the dropping of the sensitive plate into the slot in the lower drum.

The rotation of the drums so as to bring new plates into position is accomplished by power applied to a ratchet-wheel, P, on a shaft, P', supported between the frame-pieces $A^3$ and $A^4$. A pinion, $P^2$, on the said shaft engages with a gear-wheel, $B^5$, on the shaft B, and thus whenever the ratchet is operated the drums are made to move. Upon the shaft P' are located contact wheels or commutators R R' $R^2$, the first of which is in electrical connection with the shaft, while the other two are insulated therefrom. The wheel R is provided on opposite sides with alternate insulating-pieces. The commutator R' is made up of alternate blocks or squares of conducting material, each block being insulated from those immediately surrounding it, but in electrical connection with those which occupy diagonal relations to it. In the drawings we have shown a number of the blocks unshaded and a number shaded. Those blocks which are shaded (lettered $r'$) are in electrical connection with one another, but insulated from the others. In like manner the unshaded blocks (lettered $r^2$) are in electrical connection with one another. The wheel $R^2$ is made up of two conducting-halves arranged side by side upon the shaft, but insulated from the shaft and from each other. One of these halves is in electrical connection with the blocks $r'$, and the other half is in electrical connection with the blocks $r^2$. The means for making the electrical connections may be varied at will; but simple insulated wires will be sufficient.

It is to be remembered that Fig. 2 represents a vertical section of the camera looked at from the rear. When the plate falls from the upper drum upon the forks N N, it stands behind an opening, Q, in the front wall of the camera. This construction is illustrated in Figs. 5, 6, and 7. The wall at the front is made double, as shown, and is made capable of adjustment for focusing purposes by means of a bellows in the ordinary manner. Between the two front walls is located the shutter T. (Shown in dotted lines in Fig. 5 and in full lines in Fig. 1.) The normal position of the shutter is of course the position which it occupies when one of its disks $t$ is covering the aperture in the camera, and the time which it takes for the shutter to travel from one extreme position to the other is the time of exposure of the plate which happens to be in position.

In Fig. 7 we show the position of the shutter and of the mechanism which operates it.

The details of construction of the shutter and the special devices by which it is moved will be explained hereinafter.

Having now described in a general way the construction of the different parts of our camera, we will now set forth the means by which these parts are operated so as to cause them to perform their various functions.

Reference will now be had especially to Fig. 1, in which W is a galvanic battery or other generator of electricity, and W' is an open-circuit push-button for controlling the circuit of the said battery. The battery-circuit has several branches, which are operated either simultaneously or successively by a single actuation of the push-button. We have numbered these circuits 1, 2, 3, 4, and 5, as follows: Circuit No. 1 passes by way of wires 6 and 7 to a spring, 8, which is held in contact with a spring, 9, when a sensitive plate is in place behind the screen. The construction is such that an insulating spring pin or bolt or other device, $u$, is pressed out as a plate drops down in the groove of post M, carrying with it the spring 8 out into contact with 9. From 9 the circuit goes through wire 10 and magnets 11, which magnets form the field-magnet of a motor, the armature of which is a vibrating bar, Z, attached centrally to a shaft, $z$. The said shaft carries a pinion, $z'$, which meshes with a pinion, $z^2$, on the shaft on which the shutter-arms are mounted. Thus every time the armature Z is moved from one extreme position to the other the shutter will be reversed. Continuing from the magnet 11, circuit No. 1 goes by wire 12 to one part of the wheel $R^2$, thence to one set of blocks on the commutator $R'$, and from there by wire 13 around the armature Z by wire 14 to the other set of blocks on the commutator $R'$, thence to the second part of the wheel $R^2$, and by wire 15 through the push-button to battery. The operating of the button will close this circuit and operate the motor for reversing the armature, provided the polarity induced in the armature is properly related to that induced in the field-magnets. Fig. 1 shows the armature in the middle of its passage from one extreme position to the other. The parts are so related that the closing of the circuit will always throw the armature to the opposite position, as will be more fully set forth hereinafter. At the outer end of the armature Z is a spring contact-piece, $z^6$, which normally rests against one or the other of two adjustable contact-screws, $z^7$ and $z^8$. At the beginning of its movement the armature in this instance may be supposed to have been resting against the screw $z^8$, and to be on its way to make contact with $z^7$. On the completion of the latter contact-circuit No. 2 will be closed as follows: from battery through wires 6, 16, and 17, magnet 18, wire 19, to the frame 20 of the magnet 11, through the armature electrically connected with the said frame, contact-piece $z^6$, screw $z^7$, wire 21, to the commutator R, shaft $P'$, wires 22 and 15, to battery. The closing of this circuit actuates the magnet 18 and draws up its armature $o'$, as shown in Fig. 1. Now the armature $o'$ is connected by an armature-rod, $o^2$, with a pivoted segmental piece, $o^3$. The latter plays between a front and back stop, and has set into its periphery a non-conducting piece, $o^4$. Upon this non-conducting piece rests normally a spring, $o^5$. When, however, the segment is drawn forward by the movement of the armature and its rod, the spring $o^5$ is brought to bear upon the metallic portion of the segment. This operation closes circuit No. 3 as follows: by wires 6, 16, and 23 to a magnet, 24, by wire 25 to the spring $o^5$ and segment $o^3$, and thence by wires 26 and 15 to the battery. The closing of this circuit actuates the maget 24, draws up its armature $p'$, and through the connected armature-lever operates the yoke-pieces N N for dropping the sensitive plate. This action will usually be simply momentary, the circuit being broken almost immediately by the release of the push-button. Therefore the segment $o^3$ will immediately be restored to its back-stop, and circuit No. 3 will be broken by the spring $o^5$ coming in contact with the non-conducting piece $o^4$. Accordingly, as soon as the plate is dropped, the yoke or tongs will be back in place to receive another plate. However, during the momentary action of the magnet 24—that is to say, during the time when the slots in the grooved posts M are empty—the insulating spring-bolt $u$ has been pushed in, allowing contact to be made between spring 8 and one of the posts M. At that moment circuit No. 4 is closed as follows: by way of wires 6, 27, and 28 to the frame of the magnet 29, through the armature 30 of the said magnet to its back-stop 31, and thence by wire 32 to a cross-piece, 33, on the armature-lever of armature $p'$. From the back-stop 34 of that armature the circuit passes by wire 35 through the magnet 36, and by wire 37 to the spring 8. The circuit from there extends by post M and wire 38 to the wire 26, whence the return is the same as in circuit No. 3. The function performed by the closing of this circuit is the drawing of the spring-bolt J by the magnet 36. By this means the drums are left free to be rotated, which act is the function of circuit No. 5. This circuit traverses wires 6, 27, and 39, magnet 29, wire 40, the armature-lever attached to the armature of the magnet 36 and spring 41 on the said armature, and spring 42, with which the said spring 41 makes contact when the armature is attracted, wires 43, 26, and 15, back to battery. The closing of this circuit energizes the magnet 29, attracting its armature 30, and through a pawl on the lever 44, pivoted to the said armature, actuates the ratchet P the distance of one tooth. As has been described already, the moving of this ratchet operates the drums. Moving the ratchet one tooth brings the bolt J opposite the next hole in the drum D, and also brings the next plate within the drum above the slot $d^4$. As soon as the plate comes into that position, it is allowed to fall upon the supports N N, as already set forth, so as to present a new plate in position ready for use immediately after the old one is dropped out. The motion of armature 30 for moving the drum to drop a new plate breaks circuit No. 4 at contact 31. Accordingly the bolt J is released and passes into the next hole in the drum, holding it firmly in place. The springs 41 and 42 hold contact with each other (by following) long enough to allow drum-magnet 29 to move ratchet P one tooth and drop plate. This action breaks circuit No. 4 in another place by pushing spring 8 from M. The dropping of new plate, breaking circuit No. 4 at M, prevents bolt J from being redrawn when armature 30 returns to 31. By the return of bolt J circuit No. 5 is broken at 41 and 42, and the mechanism rests in the position in which it was in the beginning, except that the shutter has been reversed and the contacts upon the commutators R R' have also been reversed. Owing to these reversals another closure of the circuit through the push-button would send the current around the armature Z in an opposite direction, and consequently would polarize the armature in such a manner that it would be thrown back to its original position. If such a second closure should be made, however, the same series of results above described would be effected, and the shaft P' would be rotated one more step, again reversing the electrical connections through the commutators R R'—that is to say, the parts would be found in the position in which they are supposed to have been before the first closure of the circuit. Whichever position the parts occupy, the series of steps referred to will be effected by a simple closure of the circuit—that is to say, the shutter will be opened and closed, the plate dropped, the drum released, rotated, and locked, and a new plate inserted in place of the old. It will be observed that circuit No. 1 is broken between 8 and 9 whenever the grooves in the posts M M are empty. This prevents the exposure of a plate in the act of falling into place, as a pressure on the push-button at that moment would fail to throw the shutter. Of course each plate is exposed during the time when the shutter is passing from one extreme position to the other, and only during that time. At other times it is either in one of the chambers of the drum D or D' or behind the shutter. Suppose, now, that the focus is properly fixed and an object is located at the focal point; then by the one operation already mentioned a negative of the said object will be taken upon the plate, the said plate will be dropped into a dark closed receptacle, and a new plate will be put in the place of the old one, ready for use. A repetition of the operation would result in taking a second negative of the same object or of any other object which might in the interim have been placed at the focal point.

Ordinarily our apparatus will be set up in some permanent position and will have a fixed focal distance. It will be attached to the wall of a bank, for example, and the lens will be focused upon the teller's window. Just above the window might be located a clock which indicates the day, month, and year, as well as the hours, minutes, and seconds. The push-button may be located at any convenient point—say under the teller's desk, within easy reach of his hand. Supposing, now, that some suspicious person presents himself at the window with a check or draft or any other paper, the teller may, by pressing the button, secure a negative of the said person for future reference.

The above is simply one of the uses to which our apparatus may be applied; but we do not limit ourselves to that use.

The time which it may be necessary to expose the plate may differ under different conditions. That time can be regulated by adjusting the distance between the disks $t\, t$. We have provided means for this by making the shutter-arms movable upon their shaft. On the same shaft we fix an immovable arm, $t'$, which has a longitudinal slot in it, within which a pin is adapted to move. The pin has a handle or thumb-screw, $t^2$, by which it can be moved in the slot and secured in position. The said pin is connected with each of the shutter arms by a link, $t^3$. It is obvious that if the pin be moved in the slot the arms will be adjusted to different distances apart.

In order to compensate for the varying distances through which the disks may have to travel to reach their extreme positions, we must of course provide for varying the play of the armature Z. When the disks are near together, the armature will obviously have to pass through a smaller distance in order to bring either disk into the position which the other occupied than when the disks are farther apart. To accomplish this, we make the contacts $z^7$ and $z^8$ adjustable, so that they can be projected to a greater or less distance into the path of the armature, or rather of the contact-piece $z^6$, attached thereto. By limiting the play of the armature through the contact-screws we insure that the armature shall always come to rest with its contact $z^6$ upon one or the other of the corresponding terminals, $z^7$ or $z^8$. Instead of accomplishing the adjustment of the disks and of the contact-screws by separate operations, we may provide connections by means of which the single operation of adjusting the disks shall also adjust the contacts.

In Fig. 11 we show a modified form of the devices illustrated in Fig. 4. In this form of apparatus the steps $l\, l$ are replaced by a continuous flange, $l^3$, extending along the rod or lever L. This flange rides for the most part upon a rib, $l^4$, which extends along the central portion of the cap $d^2$. The rib, however, is cut away just above the slot $d^4$ and lets the flange $l^3$ fall down and release its plate. In practice this is the form which we prefer to use, as it can be operated with less friction.

The top and bottom of the camera are hinged, so as to be capable of being thrown open at will. When it is desired to take out the upper drum for refilling with plates, that can usually be accomplished by opening the cover and detaching the shaft B' from R. The whole upper drum, together with the cap and the slide $h$, can then be lifted out. Previous to this operation the slide will be pushed over so as to cover the opening in the cap $d^2$, and thereby prevent the possibility of any light getting to the plates. The cap will of course be lifted, owing to the fact that the pulleys or rollers $g\, g$ are supported in the said cap above the flange $e$ of the drum. After the plates have been inserted the drum can be put back in place, ready for use. In like manner the lower drum can be removed for emptying of plates or for any other reason. The latter drum is supported upon a series of folding brackets, $s^2$ $s^2$, attached to the walls of the camera. Fig. 8 illustrates the connection of these brackets with bell-crank levers, whereby they can all be brought out into position under the drum or be folded back against the walls. This can be done from the outside by means of a rod, $s^3$, which passes through a horizontal slot in one wall of the camera and connects with the levers, as shown. In putting in the lower drum it is thrust into place and held by the hand until the brackets are brought out to support it. The drum can be removed by folding the brackets against the walls through the medium of the rod $s^3$. The cover $d'$ is secured to its drum by a suitable pin or screw, 50, and the cap $d^2$ is held stationary by a check-pin, 100, or other suitable device.

It will be observed that the pawl 44 is insulated from the armature 30. If this were not the case, the apparatus would be short-circuited and the whole device rendered inoperative.

Having now described our invention, what we claim, and desire to secure by Letters Patent, is—

1. In a camera, a shaft carrying at each end a drum, one of which drums is adapted to hold sensitive plates and the other adapted to hold the same plates after they have been exposed, the drums being tight on the shaft and turning with it, as described.

2. In a camera, a shaft carrying at each end a drum, one of which is adapted to hold sensitive plates and the other adapted to hold the same plates after they have been exposed, the drums being tight on the shaft and turning with it, in combination with a motor for moving the shaft, as described.

3. In a camera, a shaft carrying at each end a drum, one of which is adapted to hold sensitive plates and the other adapted to hold the same plates after they have been exposed, the drums being tight on the shaft and turning with it, in combination with a motor for moving the shaft located within the camera, as set forth.

4. In a camera, the combination, with a permanent shaft having connections with a suitable motor, of a removable shaft having clutches for attachment to the permanent shaft, the said removable shaft forming the support for a plate holder or reservoir, as set forth.

5. A camera consisting of two drums, one of which is adapted to revolve above the other, each provided with receptacles for sensitive plates, a chamber between the said drums, and a holding or retaining device within the said chamber, the chamber being provided with the usual opening for the exposure of a plate, and the said opening being covered by a shutter, as set forth.

6. A camera consisting of two drums and a chamber between the same, both drums being connected with a common shaft and each having receptacles for sensitive plates, the upper drum having a slot in its lower cover or cap, and the lower drum having a corresponding slot in its upper cover, the said slots registering at their edges with vertical slots in the chamber, as and for the purpose set forth.

7. A camera consisting of two drums and a chamber between the same, both drums being connected with a common shaft and each having receptacles for sensitive plates, the upper drum having a slot in its lower cover or cap, and the lower drum having a corresponding slot in its upper cover, the said slots registering at their edges with vertical slots in the chamber, a retaining device within the said chamber, the chamber being provided with the usual opening for the exposure of a plate, and the said opening being covered by a shutter, as and for the purpose set forth.

8. The combination, with a drum having receptacles for sensitive plates, of retaining devices for the said plates, a motor for rotating the drum, and releasing devices brought into operation by the rotation of the drum for dropping the plates successively, as set forth.

9. In a camera, a sectional shaft provided with clutches for making proper joints, two of the sections supporting plate holders or reservoirs and being detachable and removable, for the purpose set forth.

10. In a camera having hinged or removable top and bottom, the combination, with the said top and bottom, of pintles attached thereto or formed thereon, and a sectional shaft, for which the said pintles form the bearings when the top and bottom are in place.

11. In a camera having hinged or removable top and bottom, the combination, with the said top and bottom, of pintles attached thereto or formed thereon, and a sectional shaft, for which the said pintles form the bearings when the top and bottom are in place, the said shaft being provided with clutches for making proper joints, two of the sections supporting plate-reservoirs and being detachable and removable, for the purpose set forth.

12. The combination, with a drum having receptacles for holding sensitive plates, and a motor for rotating the said drum, of a cap covering the bottom thereof, the said cap being stationary and being provided with a slot, through which the plates are adapted to fall successively as the drum is rotated.

13. The combination, with a rotating drum having receptacles for holding sensitive plates, of a cap covering the bottom thereof, the said cap being stationary and being provided with a slot, through which the plates are adapted to fall successively, as described.

14. The combination, with a rotating drum having receptacles for holding sensitive plates, of a stationary cap covering one end thereof, the said drum and cap being provided with interlocking devices, whereby the removal of the drum also causes the removal of the cap, as and for the purpose set forth.

15. The combination, with a rotating drum having receptacles for holding sensitive plates, of a stationary cap covering one end thereof, the said drum being provided with a horizontal flange which slides upon rollers attached to the cap, substantially as set forth, whereby the drum can be rotated freely while the cap remains stationary.

16. The combination, with a rotating drum having receptacles for holding sensitive plates, of a stationary cap covering one end thereof, a slot in the said cap, and a slide adapted to cover said slot, the drum, cap, and slide being secured together, whereby the drum can be removed without exposing the sensitive plates.

17. In a camera, the combination, with a shaft supporting a drum which is provided with receptacles for holding sensitive plates, of a slide covering a slot in one end of the said drum, the said slide being swiveled to the shaft and having a detachable handle, which extends through one wall of the camera in a manner to be operated from the outside thereof.

18. In a camera, the combination, with a plate holder or reservoir, of a number of folding brackets attached to the walls of the camera, the said brackets being connected with each other and with a lever extending through one wall by bell-cranks and rods, substantially as described.

19. A shutter for photographic cameras, consisting of a pair of screens mounted on arms adjustably secured to a shaft, whereby the shutter may be worked alternately from one side to the other without resetting.

20. The combination, with a pair of shutter-arms adjustable upon a shaft, of a fixed arm with which the shutter-arms have connection.

21. The combination, with a pair of shutter-arms adjustable upon a shaft, of a slotted fixed arm, a pin moving in a slot therein, and a pair of links connecting said pin with the shutter-arms, for the purpose of regulating the time of exposure.

22. In a camera, the combination, with a shutter having adjustable arms and a motor for operating the said shutter, of adjustable detents for limiting its motion in either direction.

23. The combination, with the commutators R R' R², of an electric generator and circuits and connections, as described, including a circuit-closer and electro-magnets, whereby, as a result of the operation of the circuit-closer, the camera-shutter will be reversed, the plate dropped, the drum released, rotated, and locked, and a new plate inserted in place of the old, the said operated parts being located within a camera-box.

24. In a camera, the combination, with a shutter, of an electro-magnetic motor for operating the same, a commutator in the circuit of the said motor, and electro-magnetic devices operated by the closure of the motor-circuit for reversing the commutator-connections, whereby repeated closures of the motor-circuit will actuate the shutter in opposite directions without resetting.

25. In a camera, the combination, with a shutter, a plate-supporter, a plate holder or reservoir, and a detent for the said plate-holder, of electro-magnetic devices and circuits and connections, substantially such as described, whereby a single closure of the circuit will operate the shutter, remove and restore the plate-supporter, release the plate-reservoir and rotate the same for the dropping of a new plate, and restore the detent.

26. In a camera, the combination, with a drum having receptacles for holding sensitive plates and a shaft on which said drum is mounted, of an electro-magnetic motor operatively connected with the said shaft, as and for the purpose set forth.

27. In a camera, the combination, with plate-supporting arms or levers centrally pivoted, of pins projecting from said arms or levers into an opening of substantially triangular shape in an armature rod or bar, whereby, on the operation of the magnet connected with the armature of the said lever, the outer ends of the said plate-supporting arms or levers will be spread apart and release the plate, as set forth.

28. In a camera, the combination, with an electric generator, a motor in the circuit thereof, and a shutter operated by the said motor, of detents for the said shutter forming the terminals of a second circuit, the said second circuit being operatively connected with devices for releasing a sensitive plate, whereby the shutter is first reversed to expose the plate and the plate is afterward dropped.

29. In a camera, the combination, with an electric generator, a magnet in the circuit thereof, and plate-supporting arms or levers which are operated to release the plate when the magnet is energized, of a circuit-closer brought into operation by the release of a plate for closing another circuit through a magnet which operates a detent for the plate holder or reservoir.

30. In a camera, the combination, with a battery, a magnet in the circuit thereof, and a detent for the plate-holding drum or reservoir operated by the said magnet, of a circuit-closer brought into operation by the action of the said magnet, the said circuit-closer serving to close another electric circuit through a magnet which operates the drum or reservoir.

31. In a camera, the combination, with a drum having receptacles for holding sensitive plates, of a series of holes formed in the wall or casing of the said drum, a spring-bolt adapted to enter any one of the said holes, and an electro-magnet for operating the said bolt, as and for the purpose set forth.

32. The combination, with a rotating drum having receptacles for holding sensitive plates, of a stationary cap covering the bottom thereof, a rib extending centrally along the said cap, and a series of rods each provided with a flange which extends along the bottom of one of the said receptacles and supports a sensitive plate, the said rib and cap being cut away to form a slot, through which the said plates are adapted to fall successively as the drum is rotated.

33. The combination, with a ratchet mounted upon a shaft which forms part of a battery-circuit, and an armature also forming part of a circuit of the same battery, of an insulated pawl for operating the said ratchet, the said pawl being attached to the said armature, and the said shaft carrying a series of commutators connected up in circuit with photographic apparatus, substantially as and for the purpose set forth.

34. The combination, with a rotating drum having receptacles for holding sensitive plates, with a battery and a primary-circuit closer in circuit therewith, of secondary-circuit closers controlling branch circuits and operated electro-magnetically by the actuation of the first-named circuit-closer, the said branch circuits having a return-connection between the primary-circuit closer and the battery, whereby the circuits controlled by the said secondary-circuit closers will be operated, even though the first circuit-closer should be released before their operation is accomplished.

35. In a camera, the combination, with a drum having receptacles for holding sensitive plates, a series of holes formed in the wall or casing of the said drum, and an electro-magnetically-operated spring-bolt adapted to enter any one of the holes, of a spring on the said bolt which is brought into contact with a second spring when the bolt is drawn, the two springs forming the terminals of a circuit which includes an electro-magnetic motor for operating the said drum, as and for the purpose set forth.

36. The combination, with a conducting-frame within which a sensitive plate is adapted to slide, of a spring pin or bolt actuated by the said plate when in place and a spring pressing against the said pin, the said spring and frame constituting the terminals of an electric circuit which includes an electro-magnet for releasing a plate-holder, whereby as soon as a plate is dropped the plate-holder is released and made ready to be moved forward for supplying a new plate in place of the old.

In witness whereof we have hereunto signed our names in the presence of two subscribing witnesses.

EDWARD N. BLISS.
JAMES F. MIDDLETON.

Witnesses:
F. C. LEUBUSCHER,
GEORGE H. STOCKBRIDGE.